Dec. 13, 1949     A. E. BURNS     2,490,896
POWER LAWN MOWER
Filed Feb. 14, 1945
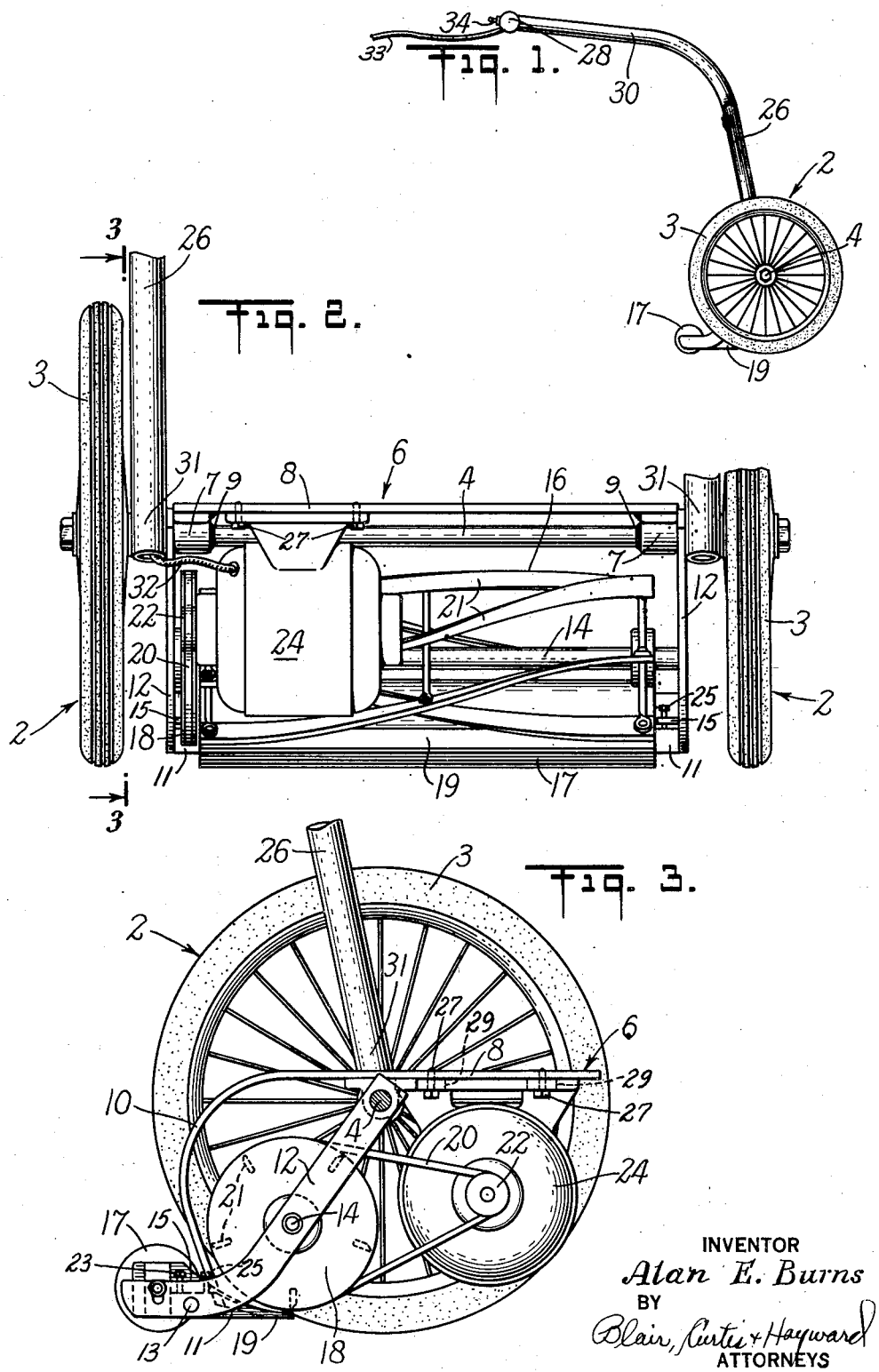
INVENTOR
*Alan E. Burns*
BY
*Blair, Curtis & Hayward*
ATTORNEYS Patented Dec. 13, 1949

2,490,896

UNITED STATES PATENT OFFICE 2,490,896

POWER LAWN MOWER

Alan E. Burns, North Hills, Pa.

Application February 14, 1945, Serial No. 577,790

2 Claims. (Cl. 56—26)

This invention relates to lawn mowers and more particularly to a mower which is propelled manually but which is provided with an electric motor for driving its cutter.

An object of this invention is to provide a lawn mower which is sturdy and lightweight in construction and which is simple and inexpensive to manufacture and operate. A further object is to provide a power lawn mower which is easy to operate and readily adaptable to use under a wide variety of conditions, and which is dependable and efficient in operation. These and other objects will be in part obvious and in part pointed out below.

The invention accordingly consists in the features of construction, combinations of elements, and arrangement of parts as will be exemplified in the structure to be hereinafter described and the scope of the application of which will be indicated in the following claims.

In the drawings:

Figure 1 is a side elevation of a lawn mower representing one embodiment of the invention;

Figure 2 is a partial front elevation; and

Figure 3 is a sectional view on the line of 3—3 of Figure 2.

Power lawn mowers have been provided in the past, some being operated by electric motors and others by gasoline motors. Certain of these prior mowers have been successful in the sense that they have accomplished certain purposes intended. However, many of these prior mowers have been complicated and heavy so as to be difficult to handle, and they have been top-heavy so that they tipped over easily. For example, quite generally these mowers have been motor propelled through complicated gearing arrangements which added to the initial cost and to the weight of the machine, and rendered them unwieldy and hard to operate. Further, it may be said that these prior power mowers were merely adaptations of the old hand mowers. That is, the power mowers were merely the prior hand mower constructions with a driving motor and gears added. This has resulted in power mowers which were "make-shift" in that they did not really meet the need for an efficient, easily operated apparatus. It is an object of the present invention to avoid these and other difficulties of the prior art, and to provide a power mower which will be satisfactory in every sense of the word.

In accordance with the present invention, a mower is provided which has light-weight, rubber-tired high wheels, and has a frame upon which the motor and the rotary cutter are mounted. The motor is illustratively electric, and the center of gravity of the entire mower is below the axle of the wheels so that the machine is very stable. Furthermore, the machine is propelled manually, but this is not objectionable because of the ease of propulsion. That is, the high wheels, the rubber tires, and the low center of gravity make the machine basically easy to propel, and as an additional feature the propelling handle is such that the propelling force is used efficiently.

Referring particularly to Figures 1 and 2 of the drawings, the mower is provided with two wheels 2 which have rubber tires 3 and wire spokes, and which are mounted on the ends of an axle 4 on ball-bearing assemblies not shown. Axle 4 is stationary and has rigidly mounted thereon a horizontal mounting frame 6 (Figure 2), which includes two knuckles 7 at the ends welded at 9 to the axle 4, a horizontal top plate 8 and (see Figure 3) two curved side members 10 which extend to the rear and down at the two sides of the frame. Also, rigidly mounted at the sides of frame 6 are two mounting brackets 12 between which are mounted a shaft 14 for a rotary cutter 16 and an adjustable supporting roller 17. Mounted on brackets 12 with roller 17 is an adjustable cutter blade 19 which is adapted to cooperate with the rotary cutter 16 to cut grass. Cutter blade 19 is carried by a pair of arms 11 pivoted respectively to brackets 12 by pivots 13. Projecting from each of brackets 12 directly over the pivoted portion of the adjacent arm 11 is an integral bracket 15 which has threaded through it a pair of stud bolts 23 and 25. The two stud bolts 23 are tightened to swing brackets 11 counterclockwise in Figure 3, and thus move the cutter blade toward the rotary cutter 16. The two stud bolts 25 are tightened to swing arms 11 and the cutter blade clockwise away from the rotary cutter.

Rotary cutter 16 has five spiral vanes 21 which have their leading ends at the right-hand side of the machine (that is, at the left in the front view of Figure 2) and mounted upon the end of cutter shaft 14 adjacent the leading ends of the spiral vanes is a driving pulley 18. Pulley 18 carries a V-belt 20 through which it receives power from a pulley 22 driven by an electric motor 24. Motor 24 is mounted on the under side of top plate 8 and is adjustable horizontally to provide proper tension on V-belt 20. This adjustment is provided by stud bolts 27 which extend through elongated slots in the frame of motor 24 and are threaded into plate 8.

As pointed out above, the mower is propelled manually by (see Figure 1) a handle 26 which has a substantially horizontal pipe portion 30 upon the end of which is a T-grip 28. Directly over roller 17, handle 26 is forked with the two sides of the fork extending down adjacent the two wheels (see Figure 2) where the fork-ends 31 are pivoted on axle 4. Fork-ends 31 provide spacing means between the ball-bearing assemblies for wheels 2 and knuckles 7 of frame 6. Power is supplied to motor 24 through a pair of lines 32 which extend into the adjacent fork-end 31 of handle 26 and thence up the handle to T-grip 28 (Figure 1). A control switch 34 is mounted on the T-grip 28 so that the motor is controlled by a hand button. A supply line 33 extends from switch 34 to a suitable source of power.

With this arrangement the mounting frame 6 and the apparatus mounted thereon forms a balanced unit, and particularly when the motor 24 and the rotary cutter 16 are operating, this unit is very stable and tends to remain in the horizontal position shown. The operator has complete control over the mower with a minimum of effort, and even when the mower is operating on bumpy ground or on a side-hill, the mower travels smoothly without danger of tipping over. The absence of all gears, heavy castings, clutches, levers, and chains, as well as the provision of a minimum number of bearings, results in a mower which is much lighter and simpler than prior power mowers.

Under some circumstances, such as when high grass is being rough cut, the stationary cutter 19 may be adjusted so that it is positioned at a distance from the periphery of the rotary cutter 16. The cutting effect is thus the result of a slashing or breaking off of the grass or the like by the rotary cutter; this is made possible by the rapid and steady rotation of the rotary cutter. As pointed out above, the rotary cutter is driven by a pulley and V-belt assembly at the leading end of the spiral vanes 21, and the rapid rotation of the rotary cutter throws the cuttings (i. e., the cut grass or the like) to the opposite end of the rotary cutter. That is, as viewed from the front of the mower in Figure 2 the cuttings are thrown to the right, and even though some cuttings may be carried over toward the front of the mower, they do not accumulate around the V-belt and the driving motor.

The propelling force is transmitted to the handle 26 along a line substantially parallel to the ground so that there is no substantial component of the propelling force directed against the ground. This arrangement is possible because of the high wheels and the low center of gravity and stability of the cutting unit, and also because the wheels need not be pushed against the ground as is necessary when traction wheels are used to impart rotation to the rotary cutter. The axis of rotation of the motor is ahead of the axis of the wheels, while the axis of the rotary cutter 16 is behind the axis of the wheels, and the axis of the wheels is substantially above the other two axes. For use, the operator merely turns on the electric motor by closing switch 34 and he then pushes the mower around the lawn at the rate which he prefers or at the rate at which the grass is cut best; the rotary cutter which is supported partially by roller 17 tends to pull itself into the grass if the mower is not propelled too rapidly, and the mower will therefore move easily at the speed most desirable for best results. In this, the weight and rotation of motor 24 tend to prevent the movement of the rotary cutter from the position shown, and even though the mower is pushed through the grass at a rapid rate the cutting will continue.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a power lawn mower, the combination of, a frame including a horizontal portion and having axle portions extending from opposite ends thereof, a pair of wheels mounted on said axle portions, a propelling handle pivoted on said axle portions adjacent said wheels, a rotary cutter assembly rotatably mounted on said frame beneath the plane of said axle portions and in trailing relationship with respect to said axle portions, a motor mounted on said frame in leading relationship with respect to said axle portions, and driving means interconnecting said motor and said rotary cutter assembly.

2. In a power lawn mower, the combination of, a frame including a horizontal portion and having axle portions extending from opposite ends thereof, a pair of wheels with resilient tires and wire spokes mounted on said axle portions, a propelling handle pivoted on said axle portions adjacent said wheels, a rotary cutter assembly including a reel with a horizontal axis rotatably mounted on said frame beneath the plane of said axle portions and in trailing relationship with respect to said axle portions, an electric motor mounted on said frame beneath the plane of said axle portions in leading relationship with respect to said axle portions, and driving means in the form of a pair of pulleys and a belt interconnecting said motor and said reel.

ALAN E. BURNS.

REFERENCES CITED

The following references are of record in the file of this patent:

UNITED STATES PATENTS

| Number | Name | Date |
| --- | --- | --- |
| 1,810,357 | Lenhart | June 16, 1931 |
| 1,825,109 | Worthington | Sept. 29, 1931 |
| 1,870,382 | Raun | Aug. 9, 1932 |
| 1,929,337 | Sullivan | Oct. 3, 1933 |
| 2,066,174 | Cregier | Dec. 29, 1936 |
| 2,148,841 | Senior | Feb. 28, 1939 |
| 2,185,659 | Chernow | Jan. 2, 1940 |